(12) United States Patent
An et al.

(10) Patent No.: US 12,411,760 B2
(45) Date of Patent: Sep. 9, 2025

(54) MEMORY DEVICE AND METHOD WITH COMPUTE EXPRESS LINK FOR DEGRADATION

(71) Applicant: SAMSUNG ELECTRONICS CO., LTD., Suwon-si (KR)

(72) Inventors: Janghyuk An, Suwon-si (KR); Yong In Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 18/499,585

(22) Filed: Nov. 1, 2023

(65) Prior Publication Data

US 2024/0411682 A1     Dec. 12, 2024

(30) Foreign Application Priority Data

Jun. 12, 2023    (KR) ........................ 10-2023-0075088

(51) Int. Cl.
    *G06F 12/00*      (2006.01)
    *G06F 12/02*      (2006.01)
    *G06F 12/1009*   (2016.01)

(52) U.S. Cl.
    CPC ........ *G06F 12/023* (2013.01); *G06F 12/1009* (2013.01)

(58) Field of Classification Search
    CPC ............... G06F 12/023; G06F 12/1009; G06F 13/4282; G06F 3/0616; G06F 3/0649; G06F 3/0653; G06F 2212/1036; G06F 12/0238; G06F 12/0292; G06F 13/4221; G06F 13/4234; G06F 3/0659; G06F 3/0604; G06F 3/0614; G06F 3/0658; G06F 12/0223;
(Continued)

(56) References Cited

U.S. PATENT DOCUMENTS 9,330,785 B1 *   5/2016   Narayanan ............. G11C 29/50
10,310,548 B2     6/2019   Park et al.
(Continued)

FOREIGN PATENT DOCUMENTS

CN      107678855 A      2/2018
JP       2022147574   *   10/2022
(Continued)

OTHER PUBLICATIONS

Zhang, Rui, et al. "Modeling of the Reliability Degradation of a FinFET-based SRAM Due to Bias Temperature Instability, Hot Carrier Injection, and Gate Oxide Breakdown." 2017 IEEE International Integrated Reliability Workshop (IIRW). IEEE, 2017, (4 pages).
(Continued)

*Primary Examiner* — Mardochee Chery
(74) *Attorney, Agent, or Firm* — NSIP Law

(57) ABSTRACT

A Compute Express Link (CXL) memory device includes: memory cell groups configured to store data; one or more sensors configured to measure degradation factors of the memory cell groups; and a control component configured to: receive a memory allocation request from a host device connected to the CXL memory device using CXL; and perform memory allocation of the memory cell groups for the host device based on degradation states of the memory cell groups according to the degradation factors of the memory cell groups.

29 Claims, 14 Drawing Sheets

(58) Field of Classification Search
CPC ..... G06F 2212/7202; G06F 2212/7211; G06F 2213/0026
USPC ......................................................... 711/154
See application file for complete search history.

(56) References Cited

U.S. PATENT DOCUMENTS

| | | |
|---|---|---|
| 10,461,721 B2 | 10/2019 | Uemura et al. |
| 10,789,112 B2 | 9/2020 | An et al. |
| 11,181,571 B2 | 11/2021 | Ryu et al. |
| 2021/0271400 A1 | 9/2021 | Hasegawa et al. |
| 2022/0391317 A1 | 12/2022 | Park et al. |
| 2023/0394140 A1* | 12/2023 | Orlando ................. G06F 21/575 |

FOREIGN PATENT DOCUMENTS

| | | | |
|---|---|---|---|
| KR | 10-2018-0122146 A | | 11/2018 |
| PT | 108852 B | * | 9/2017 |

OTHER PUBLICATIONS

Namaki-Shoushtari, Majid, et al. "ARGO: Aging-aware GPGPU Register File Allocation." 2013 International Conference on Hardware/Software Codesign and System Synthesis (Codes+ISSS). IEEE, 2013, (9 pages).

Extended European search report issued on Jun. 20, 2024, in counterpart European Patent Application No. 24150893.6 (13 pages).

\* cited by examiner

MEMORY DEVICE AND METHOD WITH COMPUTE EXPRESS LINK FOR DEGRADATION

CROSS-REFERENCE TO RELATED APPLICATIONS

This application claims the benefit under 35 USC § 119(a) of Korean Patent Application No. 10-2023-0075088, filed on Jun. 12, 2023 in the Korean Intellectual Property Office, the entire disclosure of which is incorporated herein by reference for all purposes.

BACKGROUND

1. Field

The following description relates to a memory device and method with Compute Express Link (CXL).

2. Description of Related Art

Compute Express Link (CXL) is an open standard interface for high-speed communication and may provide a comprehensive interface environment that connects multiple components such as a central processing unit (CPU), a memory, an accelerator, and other peripherals. Pools of components from multiple systems may be formed with the extensibility of CXL. For example, memory pools formed through multiple systems may be provided for a host through CXL memory pooling. In addition, multiple hosts may access the same memory address of a system through CXL memory sharing. Through the CXL, a computing environment suitable for technologies requiring high computing resources such as artificial intelligence (AI) may be stably and easily configured.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a Compute Express Link (CXL) memory device includes: memory cell groups configured to store data; one or more sensors configured to measure degradation factors of the memory cell groups; and a control component configured to: receive a memory allocation request from a host device connected to the CXL memory device using CXL; and perform memory allocation of the memory cell groups for the host device based on degradation states of the memory cell groups according to the degradation factors of the memory cell groups.

For the performing of the memory allocation, the control component may be configured to: estimate the degradation states of the memory cell groups based on the degradation factors of the memory cell groups; and determine a memory usage schedule for wear-leveling of the memory cell groups based on the degradation states of the memory cell groups.

For the determining of the memory usage schedule, the control component may be configured to determine the memory usage schedule such that degradation parameter values representing the degradation states of the memory cell groups are distributed evenly.

The control component may be configured to determine the degradation parameter values based on either one or both of bias temperature instability (BTI) and hot carrier injection (HCI) of the memory cell groups.

An operation of the memory cell groups may include a static operation in a saturation status and a transition operation in an unsaturation status, and the control component may be configured to: determine the degradation parameter values using the BTI in response to the memory cell groups in the saturation status; and determine the degradation parameter values using the HCI in response to the memory cell groups in the unsaturation status.

For the performing of the memory allocation, the control component may be configured to: select a physical memory address from memory addresses of the memory cell groups based on the memory usage schedule; and map the physical memory address to a virtual memory address according to the memory allocation request of the host device to determine address translation information.

The control component may be configured to migrate data stored in a memory space in high degradation states of the memory cell groups based on the memory usage schedule to a memory space in low degradation states of the memory cell groups.

The degradation factors may include any one or any combination of any two or more of an operating voltage, an operation temperature, an operation time, and an operation count of the memory cell groups.

A first memory cell group of the memory cell groups may have a different characteristic from a second memory cell group of the memory cell groups, and the characteristic may include either one or both of performance and life expectancy.

The memory cell groups may be divided into management groups according to a degradation management unit of any one of a page unit, a bank unit, and a rank unit, and the degradation factors may be collected and the degradation states are estimated for each of the management groups.

A CXL memory system may include the CXL memory device and the host device.

In one or more general aspects, a host device may include: one or more processors configured to: receive degradation factors of memory components of a Compute Express Link (CXL) memory device from the CXL memory device connected to the host device using CXL; estimate degradation states of the memory components based on the degradation factors of the memory components; determine a memory usage schedule for wear-leveling of the memory components based on the degradation states of the memory components; and perform a memory allocation request for the CXL memory device based on the memory usage schedule.

For the determining of the memory usage schedule, the one or more processors may be configured to determine the memory usage schedule such that degradation parameter values representing the degradation states of the memory components are distributed evenly.

The degradation parameter values may be determined based on either one or both of bias temperature instability (BTI) and hot carrier injection (HCI) of the memory components, an operation of the memory components may include a static operation in a saturation status and a transition operation in an unsaturation status, and the one or more processors may be configured to: determine the degradation parameter values using the BTI in response to the memory components in the saturation status; and determine the degradation parameter values using the HCI in response to the memory components in the unsaturation status.

In one or more general aspects, a Compute Express Link (CXL) memory box includes: CXL memory devices each comprising memory cell groups configured to store data, and a sub-control component configured to control the memory cell groups; one or more sensors configured to measure degradation factors of the CXL memory devices; and a control component configured to: receive a memory allocation request from a host device connected to the CXL memory box using CXL; and perform memory allocation of the CXL memory devices for the host device based on degradation states of the CXL memory devices according to the degradation factors of the CXL memory devices.

For the performing of the memory allocation, the control component may be configured to: estimate the degradation states of the CXL memory devices based on the degradation factors of the CXL memory devices; and determine a memory usage schedule for wear-leveling of the CXL memory devices based on the degradation states of the CXL memory devices.

For the determining of the memory usage schedule, the control component may be configured to determine the memory usage schedule such that degradation parameter values representing the degradation states of the CXL memory devices are distributed evenly.

For the performing of the memory allocation, the control component may be configured to: select a physical memory address from memory addresses of the CXL memory devices based on the memory usage schedule; and map the physical memory address to a virtual memory address according to the memory allocation request of the host device to determine address translation information.

A CXL memory system may include the CXL memory box and the host device.

In one or more general aspects, a Compute Express Link (CXL) memory system includes: a host device configured to generate a memory allocation request; CXL memory boxes each comprising CXL memory devices configured to store data, and a sub-control component configured to control the CXL memory devices; and a control component configured to perform memory allocation of the CXL memory boxes for the host device based on degradation states of the CXL memory boxes according to degradation factors of the CXL memory boxes.

The CXL memory devices each may include memory cell groups configured to store data, and a sub-control component configured to control the memory cell groups.

For the performing of the memory allocation, the control component may be configured to: estimate the degradation states of the CXL memory boxes based on the degradation factors of the CXL memory boxes; and determine a memory usage schedule for wear-leveling of the CXL memory boxes based on the degradation states of the CXL memory boxes.

For the determining of the memory usage schedule, the control component may be configured to determine the memory usage schedule such that degradation parameter values representing the degradation states of the CXL memory boxes are distributed evenly.

For the performing of the memory allocation, the control component may be configured to: select a physical memory address from memory addresses of the CXL memory boxes based on the memory usage schedule; and map the physical memory address to a virtual memory address according to the memory allocation request of the host device to determine address translation information.

In one or more general aspects, a memory management method of a Compute Express Link (CXL) memory device includes: collecting degradation factors of memory components of the CXL memory device; receiving a memory allocation request from a host device connected to the CXL memory device using CXL; and performing memory allocation of the memory components for the host device, wherein at least some parts of the memory allocation request and the memory allocation are performed based on degradation states of the memory components according to the degradation factors of the memory components.

The performing of the memory allocation may include: estimating the degradation states of the memory components based on the degradation factors of the memory components; and determining a memory usage schedule for wear-leveling of the memory components based on the degradation states of the memory components, wherein the memory allocation is performed based on the memory usage schedule.

The determining of the memory usage schedule may include determining the memory usage schedule such that degradation parameter values representing the degradation states of the memory components are distributed evenly.

The performing of the memory allocation may include: selecting a physical memory address from memory addresses of the memory components based on the memory usage schedule; and mapping the physical memory address to a virtual memory address according to the memory allocation request of the host device to determine address translation information.

Other features and aspects will be apparent from the following detailed description, the drawings, and the claims.

Figure 1:
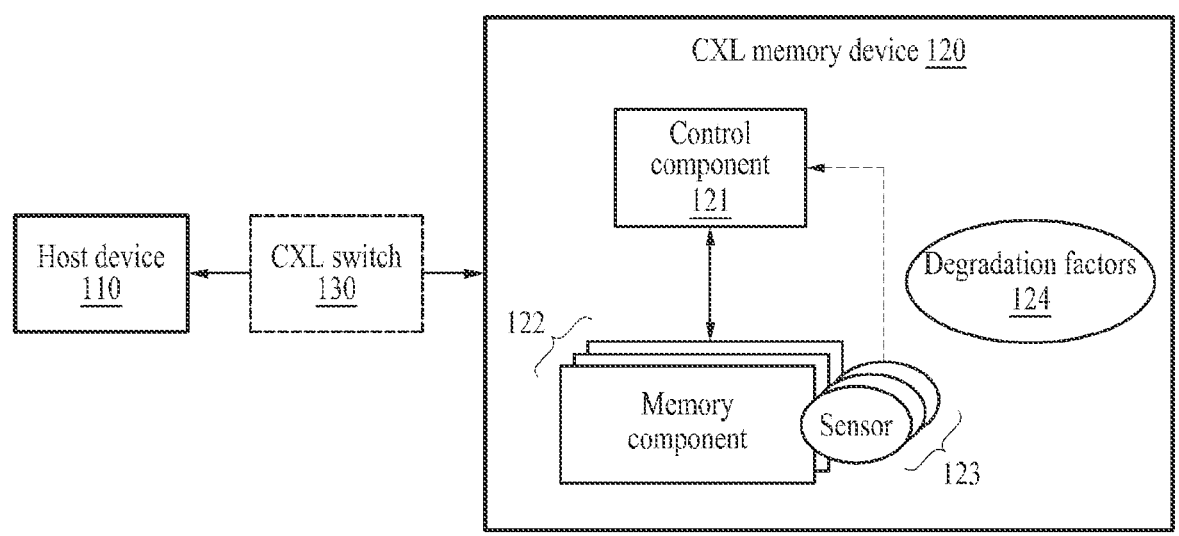
FIG. 1 illustrates an example of a schematic structure of a host device and a Compute Express Link (CXL) memory device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms of "first," "second," and "third," or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning. The use of the term "may" herein with respect to an example or embodiment, e.g., as to what an example or embodiment may include or implement, means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Hereinafter, the examples will be described in detail with reference to the accompanying drawings. When describing an example with reference to the accompanying drawings, like reference numerals refer to like elements and a repeated description related thereto will be omitted.

FIG. 1 illustrates an example of a schematic structure of a host device and a Compute Express Link (CXL) memory device (e.g., of a CXL memory system 100). CXL is a connecting technology that supports cache coherence for processors, memory extension, and accelerators. When a processor is connected to an additional component using CXL of one or more embodiments, memory coherence between a memory space of the processor and a memory space of the additional component is maintained through the CXL technology, performance is improved and software stack complexity is reduced through resource sharing, thereby reducing overall system cost. A user may focus on workload instead of memory management of an accelerator. When accelerators complement processors in supporting applications such as artificial intelligence (AI) and machine learning, CXL may serve as an open standard interface for high-speed communication. CXL may provide a comprehensive interface environment that connects multiple components such as a central processing unit (CPU), a memory, an accelerator, and other peripherals. For example, through CXL memory pooling based on extensibility of CXL, a memory pool formed through multiple systems may be provided for a host. In addition, multiple hosts may access the same memory address of a system through CXL memory sharing.

Referring to FIG. 1, a host device 110 may access memory components 122 of a CXL memory device 120 using a CXL interface and use the memory components 122. The CXL memory device 120 may include a control component 121 and the memory components 122. The control component 121 may provide connectivity between the host device 110 and the CXL memory device 120 and manage memory usage of the memory components 122. The memory components 122 may store data. The CXL technology may be used for the connection between the host device 110 and the CXL memory device 120 and/or the connection between the control component 121 and the memory components 122. In a non-limiting example, each of the control components 121, 521, 541, 631, 641, 642, 651, 720, 771, and 820 described herein with references to FIGS. 1-10 may be or include one or more processors.

The memory components 122 may collectively refer to memory types in various levels. For example, the memory components 122 may correspond to memory cell groups or memory devices. A memory cell group may refer to a group including a plurality of memory cells (e.g., a memory chip). A memory device may refer to a device including one or more memory modules. Each memory module may include a plurality of memory groups. The memory device may correspond to a device having a larger capacity than a memory cell group. When the memory components 122 correspond to memory cell groups, the CXL memory device 120 may correspond to a memory device. When the memory components 122 correspond to memory devices, the CXL memory device 120 may correspond to a memory box. The memory box may correspond to a large-capacity memory storage having a larger capacity than a memory device. However, the description of the memory cell group, memory module, memory device, and memory box is merely an example, and the CXL memory device 120 and the memory components 122 may correspond to memories in other levels which are not described herein.

The memory cell groups and the memory device may be configured with dynamic random access memories (DRAM), static random access memories (SRAM), magnetic random access memories (MRAM), PRAM, self-selecting memories using ovonic threshold switching (OTS) materials, and/or the like. However, the configurations of the memory cell groups and the memory device are not limited thereto.

The control component 121 may include various control means such as a controller and a CXL switch. The CXL switch and a CXL switch 130 herein may be separate devices. The control component 121 may include control means suitable for the level of the memory components 122. For example, when the memory components 122 correspond to memory cell groups, the control component 121 may include a memory controller. When the memory components 122 correspond to memory devices, the control component 121 may include at least one of a server controller (e.g., a baseboard management controller (BMC)) or the CXL switch.

The host device 110 and the CXL memory device 120 may correspond to devices that are physically separated from each other. The CXL memory device 120 may correspond to a device independent from the host device 110, that provides a storage space to the host device 110. For example, as will be described in non-limiting examples below, the CXL memory device 120 may perform at least some of a degradation management function including degradation data management and/or degradation scheduling and an address management function including address translation and address allocation. Although FIG. 1 shows an example in which the host device 110 and the CXL memory device 120 are connected in a one-to-one manner, a plurality of host devices and a plurality of CXL memory devices may be connected. When a plurality of host devices and a plurality of CXL memory devices are connected, the CXL memory device 120 may provide a storage space to host devices other than the host device 110 as well as the host device 110 through the memory pooling and/or memory sharing. In addition, the host device 110 may use a storage space of other CXL memory devices as well as the CXL memory device 120 through the memory pooling and/or memory sharing.

A certain memory component of the memory components 122 may have a characteristic different from that of other memory components. The characteristic may include at least one of performance or life expectancy. For example, the memory components 122 may include a first memory component and a second memory component. The first memory component and the second memory component may have different characteristics in terms of performance and/or life expectancy. Such a difference may be caused by a difference in configuration specifications between the first memory component and the second memory component, or may be caused by a difference in operation between the first memory component and the second memory component. For example, when the first memory component is a model configured to exhibit higher performance than the second memory component, the performance of the first memory component may be higher than the performance of the second memory component, or when a usage period of the second memory component is longer than a usage period of the first memory component, the life expectancy of the first memory component may be longer than the life expectancy of the second memory component.

When the degradation of the memory components 122 proceeds in different ways, the performance and the life expectancy of the memory components 122 may deteriorate. Wear-leveling may maintain degradation levels of the memory components 122 at similar levels to improve overall performance and life expectancy of the memory components 122. The CXL memory device 120 of one or more embodiments may perform the wear-leveling of the memory components 122 based on degradation factors 124 to optimize the performance and life expectancy of the memory components 122.

The control component 121 may collect the degradation factors 124 of the memory components 122 and perform the wear-leveling of the memory components 122 using the degradation factors 124. Sensors 123 may be used to collect the degradation factors 124. Sensors 123 may be disposed on the memory components 122 to have a certain distribution. The degradation factors 124 may include at least one of an operating voltage, an operating temperature, an operation time, and/or an operation count of the memory components 122. The sensors 123 may include sensing devices configured to measure at least one of the operating voltage, the operating temperature, the operation time, and/or the operation count.

The degradation factors 124 may provide a reason for deteriorating the performance of the memory components 122 and shortening the life expectancy thereof. For example, the degradation factors 124 may include at least one of the operating voltage, the operating temperature, the operation time, and/or the operation count of the memory components 122. The operating count may refer to an operating clock and/or the number of operations. The degradation of the memory components 122 may be accelerated as the operating voltage and/or the operating temperature, the operation time, and/or the operation count increase.

The host device 110 may request the CXL memory device 120 to perform memory allocation. The CXL memory device 120 may perform the memory allocation for the host device 110. According to an example, the control component 121 may include a CXL switch configured to provide a CXL environment (e.g., a CXL interface) between the host device 110 and the CXL memory device 120. In a non-limiting example, the CXL switch 130 may be disposed between the host device 110 and the CXL memory device 120. The CXL switch 130 may be distinguished from the CXL switch of the control component 121. A memory allocation request and memory allocation may be carried out through the CXL switch 130 and/or the CXL switch of the control component 121.

At least some parts of the memory allocation request of the host device 110 or the memory allocation of the CXL memory device 120 may be performed based on degradation states of the memory components 122 due to the degradation factors 124. The degradation state may represent the progress of degradation. Degradation parameter values may be determined based on the degradation factors 124, and the degradation states may be estimated based on the degradation parameter values. As a part of the wear-leveling, a memory usage schedule may be determined such that the degradation parameter values of the memory components 122 are distributed evenly. Examples of a process of deriving the degradation parameter values will be described with reference to FIG. 4 and the like.

According to an example, the CXL memory device 120 (e.g., the control component 121) may estimate the degradation states of the memory components 122 based on the degradation factors 124, and the memory usage schedule for the wear-leveling of the memory components 122 may be determined based on the degradation states. The memory usage (e.g., the memory allocation and data migration) may be performed based on the memory usage schedule. For example, the memory allocation according to the memory allocation request of the host device 110 may be performed based on the memory usage schedule. The memory usage schedule may include a usage order regarding which memory space of the memory components 122 is preferentially used when the memory usage is to be implemented together with the task performed by the host device 110. For example, when the scheduling is performed in the order of a first memory space, a second memory space, and a third memory space of the memory components 122 according to the memory usage schedule, the first memory space, the second memory space, and the third memory space may be sequentially used according to the operation of the host device 110.

According to an example, the CXL memory device 120 (e.g., the control component 121) may provide the degradation factors 124 to the host device 110. The host device 110 may estimate the degradation states of the memory components 122 based on the degradation factors 124, and the memory usage schedule for the wear-leveling of the memory components 122 may be determined based on the degradation states. The memory usage (e.g., the memory allocation and the data migration) may be performed based on the memory usage schedule. For example, the memory allocation request for the memory components 122 may be performed based on the memory usage schedule.

The memory components 122 may be divided into management groups according to a degradation management unit of a page unit, a bank unit, or a rank unit. The control component 121 may collect the degradation factors 124 for each management group. The degradation management unit may be larger than a task processing unit. The degradation management unit may correspond to a multiple of the task processing unit (e.g., 4 times, 8 times, 16 times, etc.). For example, a 64-bit task processing unit may be used for a task processing process (e.g., data load, data processing, data storage, or the like) of a kernel or an operating system of the host device 110, and a page unit (e.g., 512 kilobytes (Kb), 1 megabyte (Mb), or 2 Mb) may be used for a degradation management process (e.g., collection of the degradation factors 124, storage of the degradation factors 124, estimation of a degradation state based on the degradation factors 124, memory allocation based on the degradation state, data migration based on the degradation state, or the like).

Figure 2:
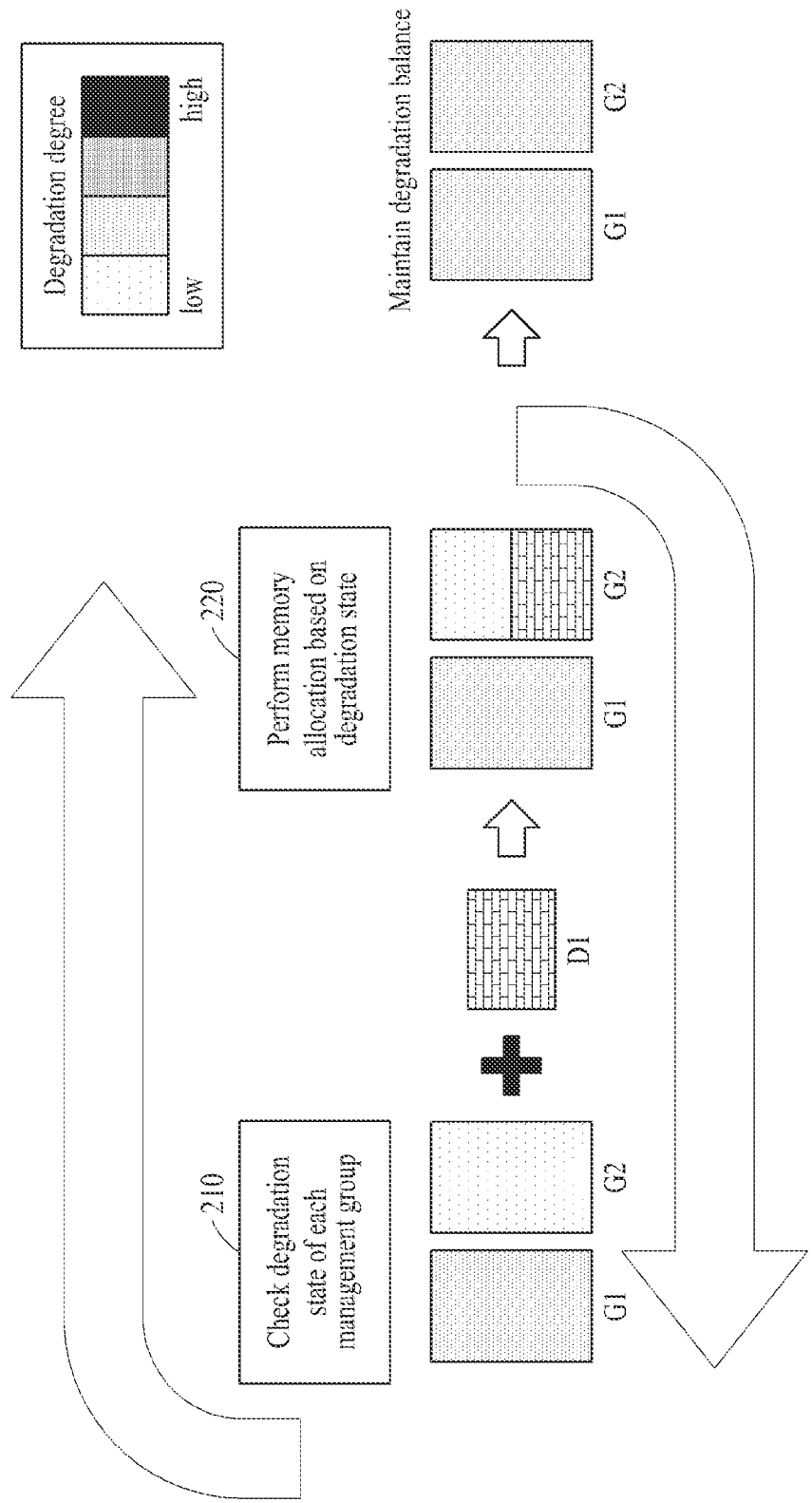
FIG. 2 illustrates an example of a wear-leveling process in consideration of degradation factors.

FIG. 2 illustrates an example of a wear-leveling process in consideration of degradation factors. Referring to FIG. 2, in operation 210, a degradation state of each management group is checked. Memory components may be divided into management groups according to the degradation management unit (e.g., the page unit or the like). For example, FIG. 2 shows a first management group G1 and a second management group G2. For example, as shown in FIG. 2, it may be confirmed that a degradation degree of the first management group G1 is higher than a degradation degree of the second management group G2 according to the checked degradation state.

In operation 220, the memory allocation may be performed based on the degradation state. Degradation parameter values may be determined based on the degradation factors, and the degradation state may be estimated based on the degradation parameter values. The memory allocation may be performed such that degradation parameter values are distributed evenly. Although FIG. 2 shows an example of the memory allocation, the data migration may be performed instead of the memory allocation. For wear-leveling, the memory allocation may be performed based on the second management group G2 in a lower degradation state than the first management group G1, and data D1 may be stored in a memory space of the second management group G2 according to the memory allocation.

Degradation balance between the first management group G1 and the second management group G2 may be maintained according to the wear-leveling. The description of the management groups G1 and G2 of FIG. 2 may be applied to all management groups of the memory components of the CXL memory device. The CXL memory device of one or more embodiments may maintain the degradation balance of all management groups according to the wear-leveling of all management groups, and may optimize the performance and the life expectancy of the memory components.

Figure 3:
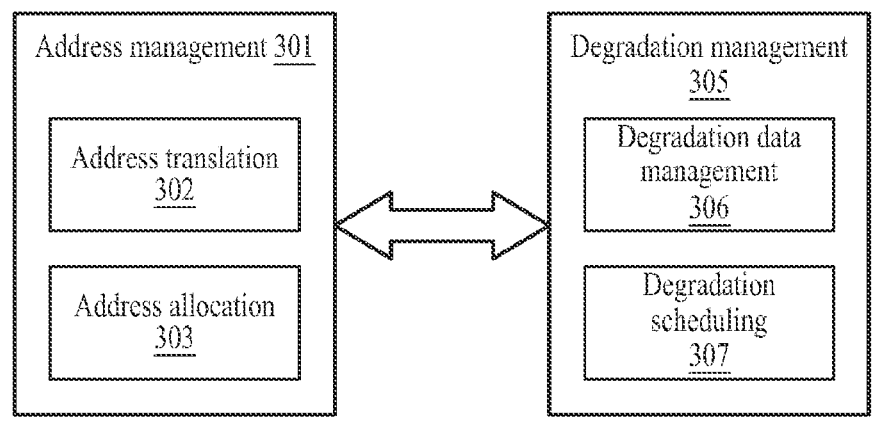
FIG. 3 illustrates an example of an address management operation and a degradation management operation.

FIG. 3 illustrates an example of an address management operation and a degradation management operation. Referring to FIG. 3, address management 301 may include address translation 302 and address allocation 303, and degradation management 305 may include degradation data management 306 and degradation scheduling 307.

The degradation data management 306 may include operations of collecting data for a degradation factor, estimating a degradation state from the degradation factor, and storing/managing the data for the degradation factor and/or the degradation state. The degradation scheduling 307 may include operations of determining a memory usage schedule that enables the wear-leveling. For example, the degradation scheduling 307 may include operations of determining degradation parameter values based on the degradation factors, and determining the memory usage schedule such that the degradation parameter values are distributed evenly.

The address translation 302 may include a translation operation between a virtual memory address used by the host device and a physical memory address of the memory component. According to the address translation 302, a virtual memory address may be translated to a physical memory address or a physical memory address may be translated to a virtual memory address. The address allocation 303 may include operations of allocating an address of a memory space according to a memory allocation request of the host device. The address allocation 303 may be performed based on the memory usage schedule for the wear-leveling.

As described with reference to FIG. 1, the CXL memory device 120 may include the control component 121 and the memory components 122, and the control component 121 may include various control means such as a controller (e.g., a memory controller or a server controller) and a CXL switch. In addition, the CXL switch 130 may be disposed between the host device 110 and the CXL memory device 120. The address management 301 and the degradation management 305 of FIG. 3 may be performed by the control component 121 and/or the CXL switch 130.

For example, both the address management 301 and the degradation management 305 may be performed by one of the control component 121 or the CXL switch 130. On the other hand, some parts of the address management 301 and the degradation management 305 may be performed by the control component 121, and the other parts may be performed by the CXL switch 130. When the control component 121 includes multiple control components (e.g., the first control component and the second control component) and at least some parts of the address management 301 and the degradation management 305 are performed by the control component 121, some parts of the at least some parts may be performed by one (e.g., the first control component) of the multiple control components, and the other parts of the at least some parts may be performed by the other one (e.g., the second control component).

Figure 4:
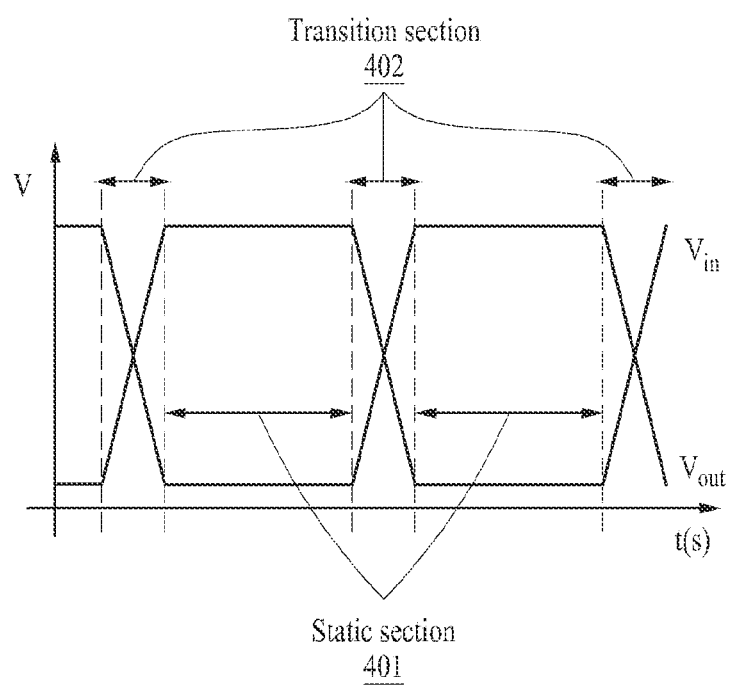
FIG. 4 illustrates an example of a static section and a transition section of memory components.

FIG. 4 illustrates an example of a static section and a transition section of memory components. As described above, the degradation parameter values may be determined based on the degradation factors of the memory components (e.g., the management groups of the memory components), and the degradation states of the memory components (e.g., the management groups of the memory components) may be estimated based on the degradation parameter values. As a part of the wear-leveling, a memory usage schedule may be determined such that the degradation parameter values of the memory components (e.g., the management groups of the memory components) are distributed evenly.

According to an example, the degradation parameter values may be determined based on at least one of bias temperature instability (BTI) or hot carrier injection (HCI) of the memory components (e.g., the memory elements of the management groups). BTI and HCI may represent a stress of a semiconductor device.

The BTI may represent a degradation phenomenon of a semiconductor device due to an electrical stress and a high-temperature environment. The electrical stress and the high-temperature environment may cause a change in a change movement path inside the semiconductor device and may change electrical characteristics of the semiconductor device. The BTI may include negative bias temperature instability (NBTI) and positive bias temperature instability (PBTI). NBTI may represent a degradation phenomenon of positive metal-oxide-semiconductor field-effect transistor (pMOSFET) in which a semiconductor device is turned on when a negative bias is applied to a gate of the semiconductor device, and PBTI may represent a degradation phenomenon of a negative MOSFET (nMOSFET) in which the semiconductor device is turned on when a positive bias is applied to the gate. In a case of NBTI, holes formed in a PMOS channel may be trapped in a gate oxide to cause an increase in a threshold voltage, and in a case of PBTI, electrons formed in a NMOS channel may be trapped in the gate oxide to cause an increase in a threshold voltage. BTI may shorten the lifespan of a semiconductor device and affect its performance.

HCI may represent a phenomenon that occurs when a carrier moves to a high energy state due to the electrical stress and the high-temperature environment. HCI may appear due to a carrier accelerated by a stronger electric field as the dimension of a semiconductor device decreases. HCI may cause defects in the semiconductor device due to collision of the carrier in the high energy state in a charge movement path and may change the electrical characteristics of the semiconductor device. An electron-hole pair (EHP) generated by the collision of hot carriers accelerated by a strong electric field between a drain and a source of the semiconductor device may be trapped in the gate oxide, or the hot carriers may be directly trapped in the gate oxide to increase a threshold voltage. HCI may shorten the lifespan of a semiconductor device and affect its performance.

An operation of the memory components (e.g., the memory elements of the memory components) may include a static operation in a saturation status and a transition operation in an unsaturation status. A graph of FIG. 4 may represent an input voltage Vin and an output voltage Vout of the memory components. In FIG. 4, a static section 401 may correspond to a static operation of memory components, and a transition period 402 may correspond to a transition operation of memory components.

According to an example, degradation parameter values may be determined using BTI in the static section 401 in which the memory components are in the saturation status, and the degradation parameter values may be determined using HCI in the transition section 401 in which the memory components are in the unsaturation status. A degradation parameter using BTI may be represented by Equation 1 below, for example, and a degradation parameter using HCI may be represented by Equation 2 below, for example.

$$\sim \Delta V_{th} \propto V^6 \cdot e^{\frac{-2000}{T}} \cdot t^{0.2} \qquad \text{Equation 1}$$

In Equation 1, $\sim \Delta V_{th}$ may represent a change of a threshold voltage of a memory component according to BTI, V may represent an operating voltage of a memory component, T may represent an operation temperature of a memory component, and t may represent an operation time and/or an operation count of a memory component. V, T, and t may correspond to degradation factors. The change of the threshold voltage according to BTI may be estimated based on the degradation factors, and the change of the threshold voltage may be used as a degradation parameter value. For example, a memory usage schedule may be determined such that degradation parameter values corresponding to the change of the threshold voltage values of the memory components become even in the static section 401. For example, the memory usage schedule may be determined such that the memory usage of a memory space having a great change of the threshold voltage decreases and the memory usage of a memory space having a small change of the threshold voltage increases.

$$\sim \Delta I_{on} \propto V^{10} \cdot e^{\frac{-800}{T}} \cdot t^{0.4} \qquad \text{Equation 2}$$

In Equation 2, $\sim \Delta I_{on}$ may represent a change of a current of a memory component in a turned-on state according to HCI, V may represent an operating voltage of a memory component, T may represent an operation temperature of a memory component, and t may represent an operation time and/or an operation count of a memory component. V, T, and t may correspond to degradation factors. A change of a current in a turned-on state according to HCI may be estimated based on the degradation factors, and the change of the current may be used as a degradation parameter value. For example, a memory usage schedule may be determined such that degradation parameter values corresponding to the change of the current change values of the memory components become even in the transition section 402. For example, the memory usage schedule may be determined such that the memory usage of a memory space having a great change of the current decreases and the memory usage of a memory space having a small change of the current increases.

Figure 5A:
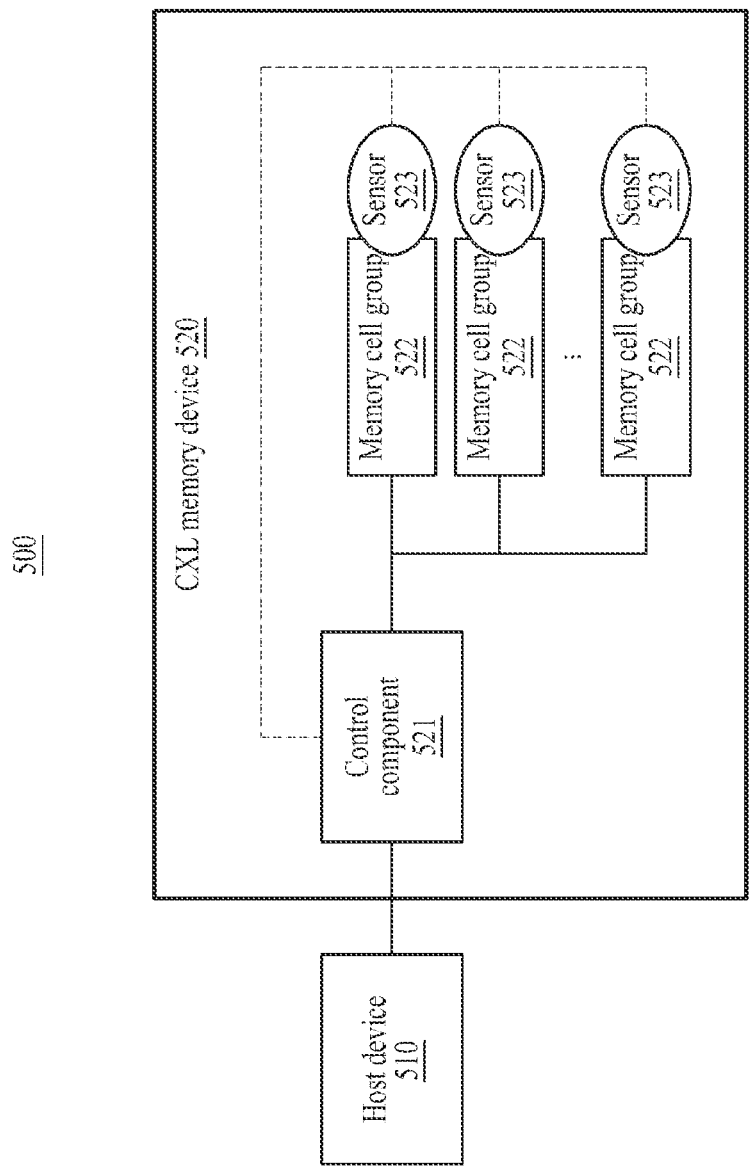
FIGS. 5A and 5B illustrate examples of components related to a CXL memory device.
Figure 5B:
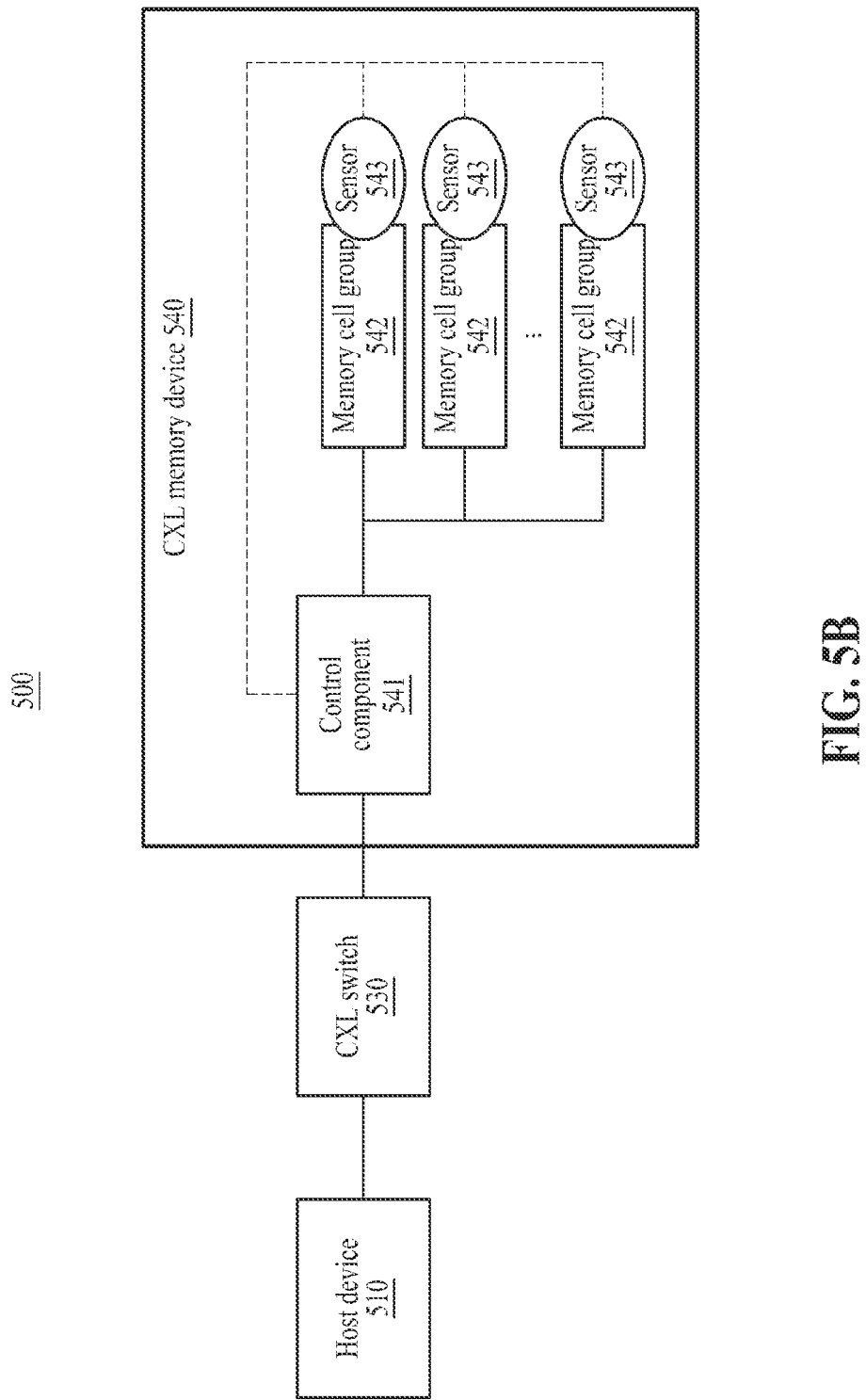

FIGS. 5A and 5B illustrate examples of components related to a CXL memory device (e.g., of a CXL memory system 500). Referring to FIG. 5A, a CXL memory device 520 may include memory cell groups 522 configured to store data, sensors 523 configured to measure degradation factors of the memory cell groups, and a control component 521 configured to receive a memory allocation request from a host device connected to a memory device using CXL and perform memory allocation of the memory cell groups for the host device based on degradation states of the memory cell groups according to the degradation factors of the memory cell groups. According to an example, the control component 521 may correspond to a memory controller.

The control component 521 may perform address management and degradation management. The wear-leveling of the memory cell group 522 may be achieved through the address management and the degradation management. CXL may be used for connection between a host device 510 and the CXL memory device 520 and connection between the control component 521 and the memory cell groups 522.

The control component 521 may perform degradation data management and degradation scheduling for the degradation management. The control component 521 may collect degradation factors of the memory cell groups 522. According to an example, the control component 521 may perform the degradation management using a fabric manager. The fabric manager may be an application logic for system configuration and resource allocation. A fabric manager may understand and manage a topology of components connected using CXL. The control component 521 may collect degradation factors using the sensors 523. The sensors 523 may generate sensor data for the memory cell groups 522. The degradation factors may be determined based on the sensor data. Although FIG. 5A shows an example in which the sensors 523 and the memory cell groups 522 are arranged in a one-to-one manner, the number of memory cell groups 522 may be different from the number of sensors 523. For example, one sensor may be disposed for a plurality of memory cell groups, or a plurality of sensors may be disposed for one memory cell group. Sensor data may be processed to increase estimation accuracy of degradation factors for the degradation states of the memory cell groups 522.

The CXL memory device 520 may further include a management memory configured to store the degradation factors. The control component 521 may manage a history of the degradation factors using the management memory. The management memory may correspond to a non-volatile memory. In this case, the history of the degradation factors may be stably managed regardless of whether the power of the CXL memory device 520 is maintained. However, the memory type of the management memory is not limited thereto. The history of degradation factors may contribute to an increase of the estimation accuracy of the degradation state. The CXL memory device 520 of one or more embodiments may more accurately reflect actual degradation states of the memory cell groups 522 by estimating degradation states using the history of the degradation factors accumulated over a long period of time, compared to a typical CXL memory device which estimates degradation states using the degradation factors at one time point. By increasing the estimation accuracy of the degradation states, the CXL memory device 520 of one or more embodiments may improve the wear-leveling effect.

The control component 521 may estimate degradation states based on the degradation factors and determine a memory usage schedule based on the degradation states. The memory usage schedule may include an allocation schedule and a migration schedule. The control component 521 may determine the memory usage schedule such that the degradation states of the memory cell groups 522 (e.g., the management groups of the memory cell groups 522) are equalized.

The control component 521 may receive a memory allocation request from the host device 510 and perform the memory allocation of the CXL memory devices 520 for the host device 510. The control component 521 may perform address translation and address allocation for the address management.

The CXL memory device 520 and the host device 510 may use different addressing schemes. Physical memory addresses may be assigned to memory spaces of the memory cell groups 522. A physical memory address may correspond to an actual address. The CXL memory device 520 may use physical memory addresses. The host device 510 may use a virtual memory address. The memory allocation request of the host device 510 may include a virtual memory address. When there is the memory allocation request of the host device 510, an address translator of the control component 521 may map an appropriate physical memory address to the virtual memory address of the memory allocation request.

The control component 521 may map a physical memory address to a virtual memory address based on the memory usage schedule for wear-leveling. The address translator may sequentially map physical memory addresses according to the memory use schedule in response to memory allocation requests of the host device 510. The address translator may select a physical memory address from the memory addresses of the memory cell groups 522 based on the memory usage schedule, and map the selected physical memory address to the virtual memory address according to the memory allocation request of the host device 510 to determine address translation information. The address translation information between the virtual memory addresses and the physical memory addresses may be managed with an address translation table.

The control component 521 may perform the memory allocation with reference to the address translation information, and perform deallocation for the allocated physical memory address. The control component 521 may map a physical memory address to a virtual memory address with reference to the memory usage schedule, and perform the memory allocation according to the corresponding physical memory address. When it is determined that the same data staying in the same memory space will cause the degradation of the corresponding memory space, the corresponding data stored in the memory space in high degradation states of the memory cell groups 522 may be migrated to a memory space in low degradation states of the memory cell groups 522 based on the memory usage schedule. The control component 521 may determine whether to perform the data migration. When a physical memory address of a memory space to be subject to the data migration is specified, a new physical memory address for data of the corresponding physical memory address may be selected with reference to the memory usage schedule. The data of the existing physical memory address may be migrated to a memory space of the new physical memory address.

Referring to FIG. 5B, a CXL memory device 540 may include a control component 541, memory cell groups 542, and sensors 543. Unlike FIG. 5A, in FIG. 5B, a CXL switch 530 may be disposed between the host device 510 and the CXL memory device 540. In this case, both the address management and the degradation management may be performed by one of the control component 541 or the CXL switch 530. On the other hand, some parts of the address management and the degradation management may be performed by the control component 541, and the other parts may be performed by the CXL switch 530. For example, the control component 541 may perform the degradation management and the CXL switch 530 may perform the address management. In another example, the control component 541 may perform degradation data management which is a part of the degradation management, and the CXL switch 530 may perform degradation scheduling which is the other part of the degradation management together with the address management. In addition, the description of the CXL memory device 520 may be applied to the CXL memory device 540.

Figure 6A:
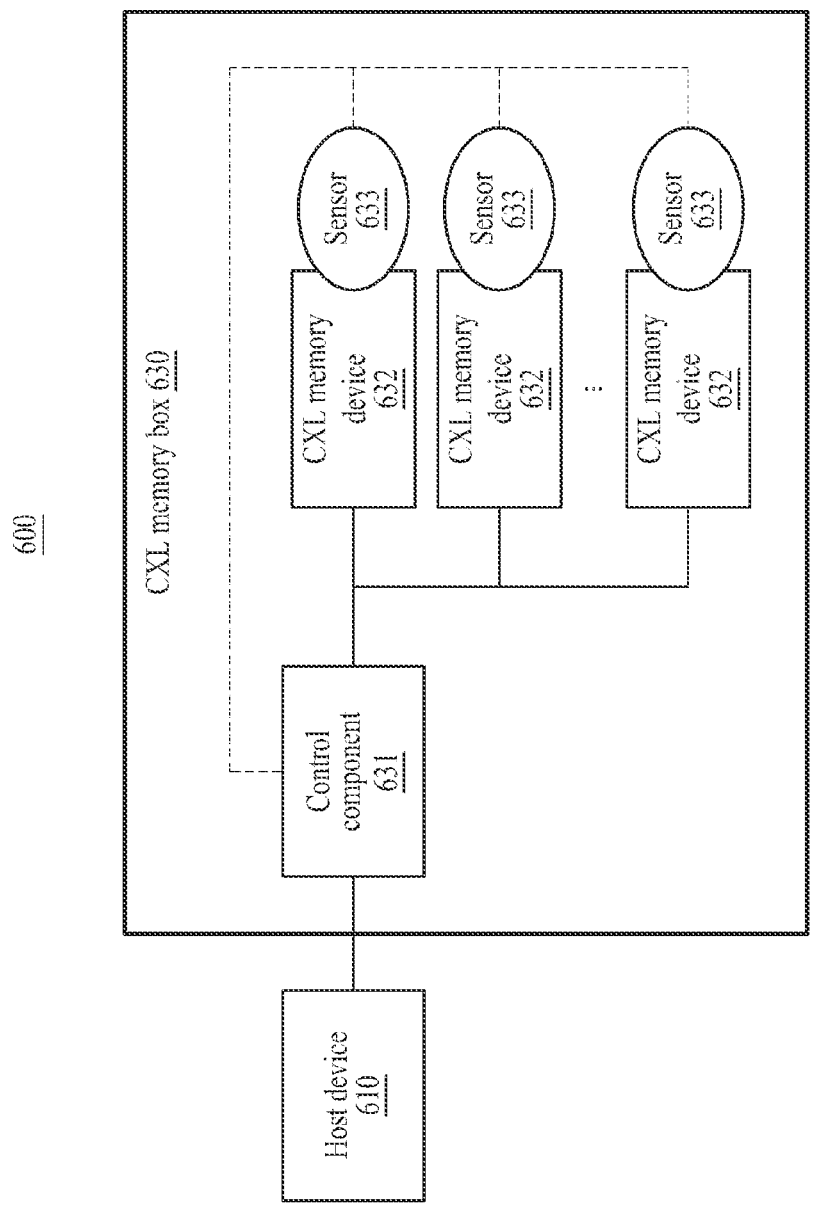
FIGS. 6A, 6B, and 6C, illustrate examples of components related to a CXL memory box.
Figure 6B:
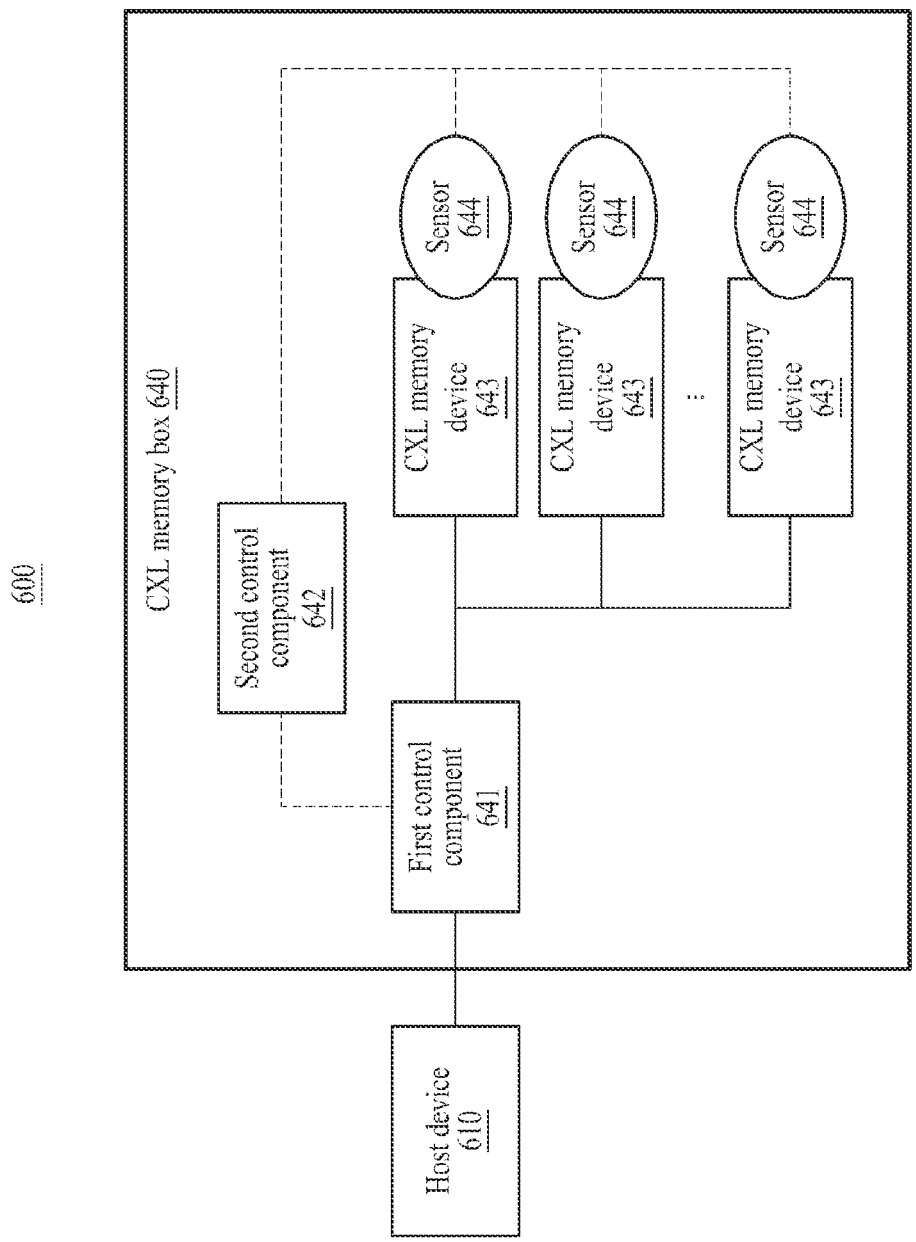
Figure 6C:
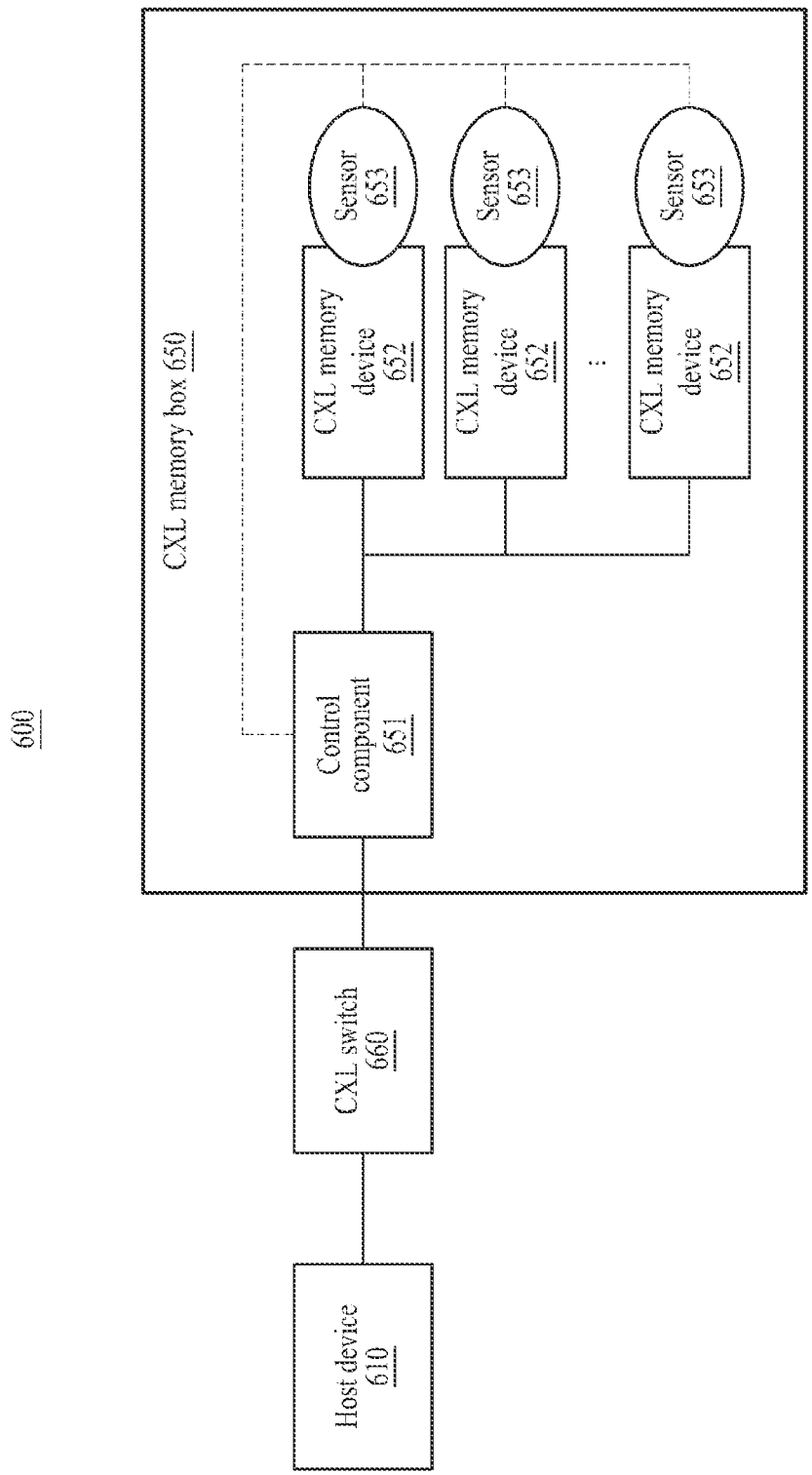

FIGS. 6A, 6B, and 6C, illustrate examples of components related to a CXL memory box (e.g., of a CXL memory system 600). Referring to FIG. 6A, a CXL memory box 630 may include CXL memory devices 632 each including memory cell groups configured to store data and a sub-control component (e.g., the control component 521 of FIG. 5A or the control component 541 of FIG. 5B) configured to control the memory cell groups, sensors 633 configured to measure degradation factors of the CXL memory devices 632, and a control component 631 configured to receive a memory allocation request from a host device 610 connected to the CXL memory box 630 using CXL, and perform memory allocation of the CXL memory devices 632 for the host device 610 based on the degradation states of the CXL memory devices 632 according to the degradation factors of the CXL memory devices 632. According to an example, the control component 631 may correspond to a server controller (e.g., a BMC) or a CXL switch. Each CXL memory device of the CXL memory devices 632 may correspond to the CXL memory device 520 of FIG. 5A and the CXL memory device 540 of FIG. 5B.

The control component 631 may perform address management and degradation management. The wear-leveling of the CXL memory devices 632 may be achieved through the address management and the degradation management. CXL may be used for connection between the host device 610 and the CXL memory box 630 and connection between the control component 631 and the CXL memory devices 632.

The control component 631 may collect degradation factors of the CXL memory devices 632. According to an example, the control component 631 may perform the degradation management using a fabric manager. The control component 631 may collect degradation factors using the sensors 633. The CXL memory box 630 may further include a management memory configured to store the degradation factors. The control component 631 may manage a history of the degradation factors using the management memory. The management memory may correspond to a non-volatile memory.

The control component 631 may estimate degradation states of the CXL memory devices 632 based on the degradation factors of the CXL memory devices 632, and determine a memory usage schedule for the wear-leveling of the CXL memory devices 632 based on the degradation states of the CXL memory devices 632. The control component 631 may determine the memory usage schedule such that degradation parameter values representing the degradation states of the CXL memory devices 632 are distributed evenly. The control component 631 may select a physical memory address from memory addresses of the CXL memory devices 632 based on the memory usage schedule, and map the physical memory address to a virtual memory address according to a memory allocation request of the host device 610 to determine address translation information.

Referring to FIG. 6B, a CXL memory box 640 may include a first control component 641, a second control component 642, CXL memory devices 643, and sensors 644. Unlike the CXL memory box 630 of FIG. 6A, the CXL memory box 640 of FIG. 6B may include multiple control components of the first control component 641 and the second control component 642. According to an example, the first control component 641 may correspond to a CXL switch, and the second control component 642 may correspond to a server controller (e.g., a BMC).

Both the address management and the degradation management may be performed by one of the first control component 641 or the second control component 642. On the other hand, some parts of the address management and the degradation management may be performed by the first control component 641, and the other parts may be performed by the second control component 642. For example, the degradation management may be performed by the second control component 642 and the address management may be performed by the first control component 641. In another example, the second control component 642 may perform degradation data management which is a part of the degradation management, and the first control component 641 may perform degradation scheduling which is the other part of the degradation management together with the address management. In addition, the description of the CXL memory box 630 of FIG. 6A may be applied to the CXL memory box 640.

Referring to FIG. 6C, a CXL memory box 650 may include a first control component 651, CXL memory devices 652, and sensors 653. Unlike FIGS. 6A and 6B, in FIG. 6C, a CXL switch 660 may be disposed between the host device 610 and the CXL memory box 650. In this case, both the address management and the degradation management may be performed by one of the control component 651 or the CXL switch 660. On the other hand, some parts of the address management and the degradation management may be performed by the control component 651, and the other parts may be performed by the CXL switch 660. For example, the degradation management may be performed by the control component 651 and the address management may be performed by the CXL switch 660. In another example, the control component 651 may perform degradation data management which is a part of the degradation management, and the CXL switch 660 may perform degradation scheduling which is the other part of the degradation management together with the address management. In addition, the description of the CXL memory box 630 may be applied to the CXL memory box 650.

Figure 7A:
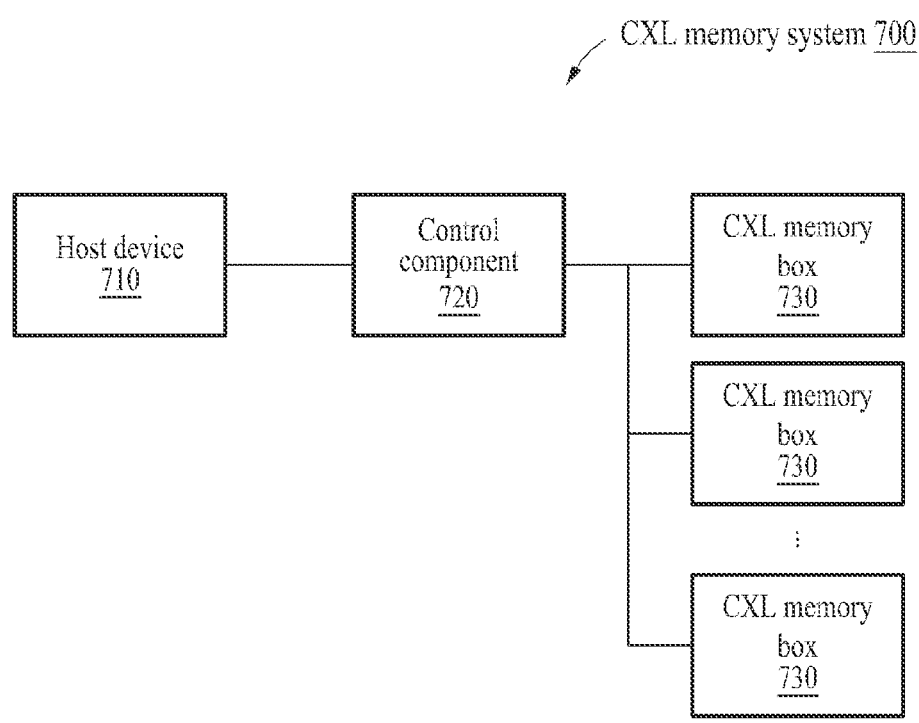
FIG. 7A illustrates an example of components related to a CXL memory system.

FIG. 7A illustrates an example of components related to a CXL memory system. Referring to FIG. 7A, a CXL memory system 700 may include a host device 710 configured to generate a memory allocation request, CXL memory boxes 730 each including CXL memory devices configured to store data, and a sub-control component (e.g., the control component 631 of FIG. 6A, the first control component 641 and the second control component 642 of FIG. 6B, or the control component 651 of FIG. 6C) configured to control the CXL memory devices, and a control component 720 configured to perform memory allocation of the CXL memory boxes 730 for the host device 710 based on degradation states of the CXL memory boxes 730 according to degradation factors of the CXL memory boxes 730. The CXL memory devices may each include memory cell groups configured to store data, and a sub-control component (e.g., the control component 521 of FIG. 5A or the control component 541 of FIG. 5B) configured to control the memory cell groups. According to an example, the control component 720 may correspond to a server controller (e.g., a BMC) or a CXL switch. Each memory box of the CXL memory boxes 730 may correspond to the CXL memory box 630 of FIG. 6A, the CXL memory box 640 of FIG. 6B, and the CXL memory box 650 of FIG. 6C.

The control component 720 may perform the address management and the degradation management. The wear-leveling of the CXL memory boxes 730 may be achieved through the address management and the degradation management. CXL may be used for connection between the host device 710 and the control component 720 and connection between the control component 720 and the CXL memory boxes 730. The control component 720 may collect degradation factors of the CXL memory boxes 730. According to an example, the control component 720 may perform the degradation management using a fabric manager. The control component 720 may collect degradation factors using sensors of the CXL memory boxes 730. The control component 720 may include a management memory configured to store degradation factors. The control component 720 may manage a history of the degradation factors using the management memory. The management memory may correspond to a non-volatile memory.

The control component 720 may estimate degradation states of the CXL memory boxes 730 based on the degradation factors of the CXL memory boxes 730, and determine a memory usage schedule for the wear-leveling of the CXL memory boxes 730 based on the degradation states of the CXL memory boxes 730. The control component 720 may determine the memory usage schedule such that degradation parameter values representing the degradation states of the CXL memory boxes 730 are distributed evenly. The control component 720 may select a physical memory address from memory addresses of the CXL memory boxes 730 based on the memory usage schedule, and map the physical memory address to a virtual memory address according to a memory allocation request of the host device to determine address translation information.

Figure 7B:
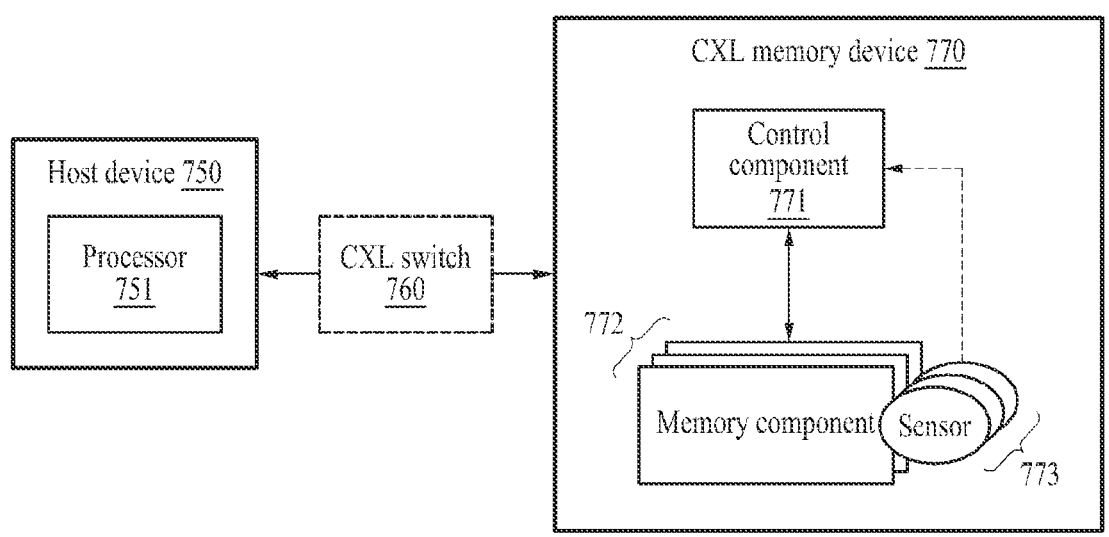
FIG. 7B illustrates an example of components related to wear-leveling of a host device.

FIG. 7B illustrates an example of components related to wear-leveling of a host device. Referring to FIG. 7B, a host device 750 may access memory components 772 of a CXL memory device 770 using a CXL interface and use the memory components 772. The CXL memory device 120 may include a control component 771 and the memory components 772. The control component 121 may provide connectivity between the host device 110 and the CXL memory device 120 and manage memory usage of the memory components 122. The memory components 122 may store data. The CXL technology may be used for the connection between the host device 110 and the CXL memory device 120 and/or the connection between the control component 121 and the memory components 122.

The host device 750 may include a processor 751. The host device 750 may execute a kernel or an operating system using the processor 751. The processor 751 may perform at least some parts of the address management and the degradation management for memory use accompanied with execution of a kernel or an operating system. The processor 751 may receive degradation factors of the memory components 772 of the CXL memory device 770 from the CXL memory device 770 connected to the host device 750 using CXL, estimate degradation states of the memory components 772 based on the degradation factors of the memory components 772, determine a memory usage schedule for wear-leveling of the memory components 772 based on the degradation states of the memory components 772, and perform a memory allocation request for the CXL memory device 770 based on the memory usage schedule.

The control component 771 may provide degradation factors to the host device 750 (e.g., the processor 751, the kernel, or the operating system). The host device 750 may estimate the degradation states of the memory components 772 based on the degradation factors, and determine a memory usage schedule for wear-leveling of the memory components 772 based on the degradation states. The memory usage (e.g., the memory allocation or the data migration) may be performed based on the memory usage schedule.

In a non-limiting example, a CXL switch 760 may be disposed between the host device 750 and the CXL memory device 770. The address management and the degradation management may be performed by the processor 751, the CXL switch 760, and the control component 771. The wear-leveling of the memory components 772 may be achieved through the address management and the degradation management.

According to an example, the control component 771 may perform degradation data management of the degradation management. The control component 771 may collect degradation factors of the memory components 772. The control component 771 may collect degradation factors using sensors 773. The degradation factors may be determined based on sensor data of the sensors 773. The CXL memory device 770 may further include a management memory, and the control component 771 may manage data of the degradation factors using the management memory. The control component 771 may provide the degradation factors corresponding to degradation information to the host device 750.

The processor 751 may perform degradation scheduling based on the degradation factors. The processor 751 may estimate degradation states of the memory components 772 based on the degradation factors, and determine the memory usage schedule for wear-leveling of the memory components 772 based on the degradation states. The memory usage schedule may include an allocation schedule and a migration schedule. The processor 751 may determine the memory usage schedule such that degradation states of the memory components 772 (e.g., management groups of the memory components 772) are equalized. The processor 751 may generate a memory allocation request and/or a data migration request based on the memory usage schedule, and the memory allocation and/or data migration may be performed through the switch 760 or the control component 771.

According to an example, a degradation query application program interface (API) may be provided to the host device 750. The processor 751 may request degradation information to the control component 771 using the degradation query API. The control component 771 may provide the degradation information to the host device 750 using the degradation query API.

Figure 8:
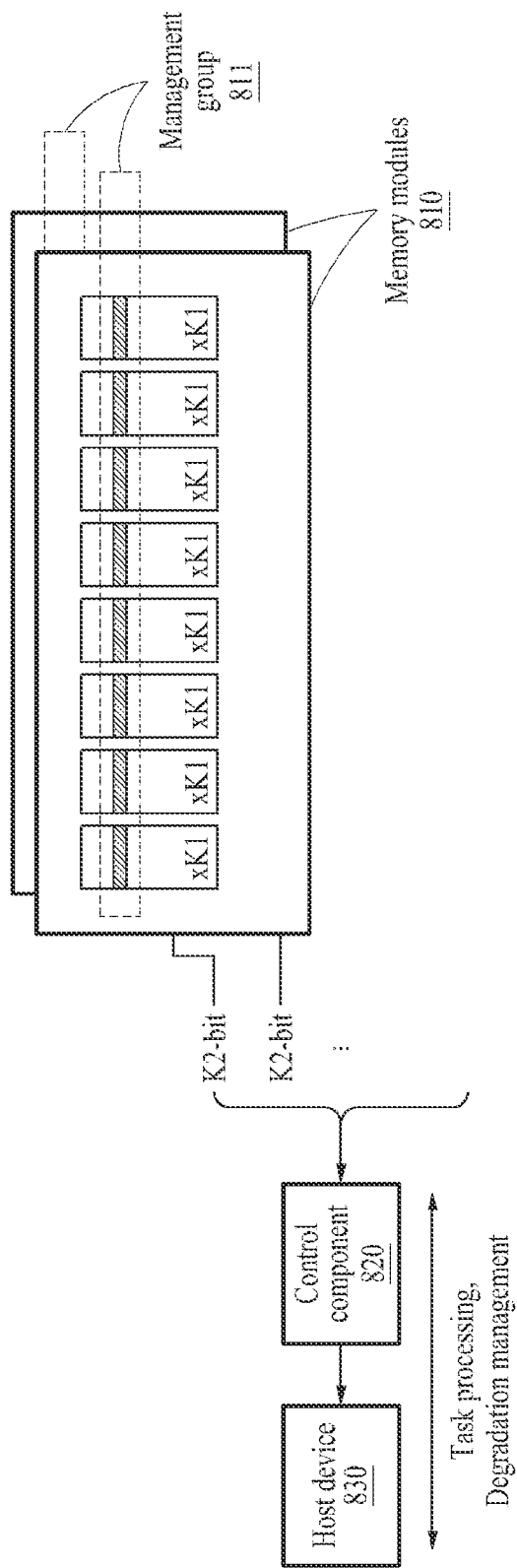
FIG. 8 illustrates an example of a management unit used for task processing and degradation management.

FIG. 8 illustrates an example of a management unit used for task processing and degradation management. As described above, the memory devices may be divided into management groups according to a degradation management unit such as a page unit, bank unit, or rank unit, and the memory management based on the degradation factors may be performed for each management group. Referring to FIG. 8, each of a plurality of management groups 811 may be distributed over a plurality of memory areas (e.g., memory cell groups) of a memory module 810. For example, each memory area may use a K1-bit bandwidth, and each memory module 810 may use a K2-bit bandwidth. In the example of FIG. 8, K2=K1*8 may be satisfied. For example, K1=8 and K2=64 may be satisfied. 64-bit may correspond to a task processing unit. For example, when a management group 811 uses a degradation management unit of 512 Kb page unit, the management group 811 may be formed across eight memory areas of a memory module 810. However, the numerical values mentioned herein are examples, and various other numerical values may be used.

The degradation management and the wear-leveling may be performed based on the management groups 811 formed across the plurality of memory modules 810 as described above. Referring to FIG. 8, the control component 820 of the CXL memory device may collect degradation factors of each of a plurality of management groups 811. The control component 820 of the CXL memory device or a host device 830 may estimate degradation states of each of the plurality of management groups 811 based on the degradation factors. The control component 820 or the host device 830 may generate a memory usage schedule for wear-leveling based on the degradation states of each of the plurality of management groups 811.

Figure 9:
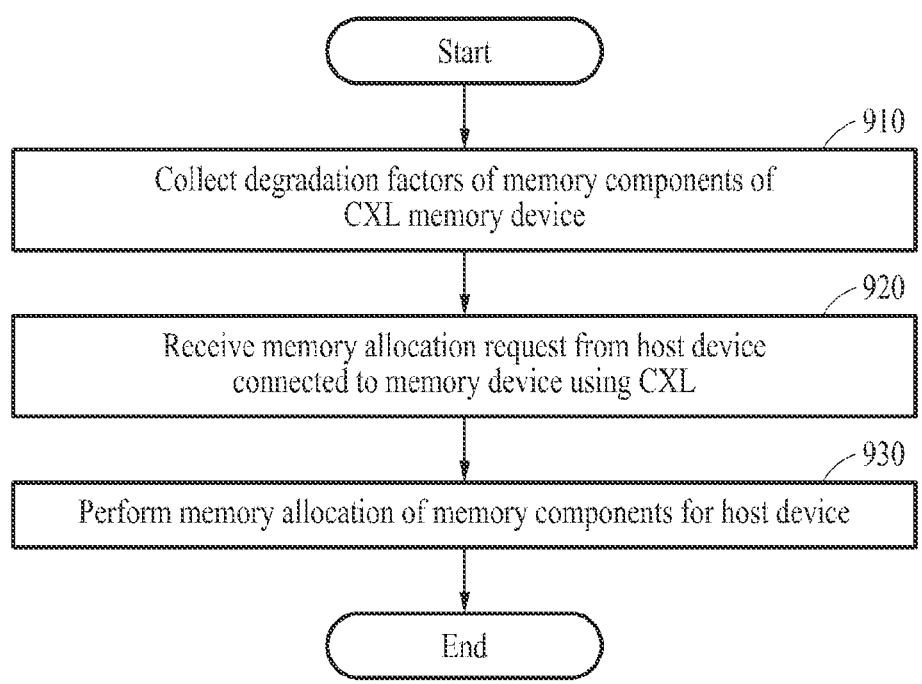
FIG. 9 illustrates an example of a memory management method based on a degradation factor by a CXL memory device.

FIG. 9 illustrates an example of a memory management method based on a degradation factor by a CXL memory device. Operations 910 through 930 of FIG. 9 may be performed in the shown order and manner. However, the order of one or more of the operations may change and/or one or more of the operations may be performed in parallel or simultaneously without departing from the spirit and scope of the shown examples.

Referring to FIG. 9, a CXL memory device may collect degradation factors of memory components of the CXL memory device in operation 910, receive a memory allocation request from a host device connected to a memory device using CXL in operation 920, and perform memory allocation of the memory devices for the host device in operation 930. At least some parts of the memory allocation request or the memory allocation may be performed based on degradation states of the memory devices according to degradation factors of the memory devices.

The CXL memory device may estimate the degradation states of the memory devices based on degradation factors of the memory devices, and determine a memory usage schedule for wear-leveling of the memory devices based on the degradation states of the memory devices. The memory allocation may be performed based on the memory usage schedule.

When the memory usage schedule is determined, the CXL memory device may determine the memory usage schedule such that the degradation parameter values representing the degradation states of the memory devices are distributed evenly. The degradation parameter values may be determined based on at least one of BTI or HCI of the memory devices. The operation of the memory devices may include a static operation in a saturation status and a transition operation in a unsaturation status. When the memory devices are in the saturation status, the degradation parameter values may be determined using BTI, and when the memory devices are in the unsaturation status, the degradation parameter values may be determined using HCI.

When performing the memory allocation in operation 930, the CXL memory device may select a device memory address from a memory addresses of the memory devices based on the memory usage schedule, and map the device memory address to a virtual memory address according to a memory allocation request of the host device to determine address translation information.

The CXL memory device may migrate data stored in a memory space in high degradation states of the memory devices to a memory space in low degradation states of the memory devices based on the memory usage schedule.

The CXL memory device may provide degradation factors of the memory devices to the host device. The memory allocation request may be performed based on the degradation states of the memory devices estimated by the host device according to the degradation factors of the memory devices.

The degradation factors may include at least one of an operating voltage, an operation temperature, an operation time, or an operation count of the memory devices.

A first memory device of the memory devices may have a different characteristic from a second memory device of the memory devices. The characteristic may include at least one of performance or life expectancy.

The memory devices may be divided into management groups according to a degradation management unit of a page unit, bank unit, or rank unit. The collection of the degradation factors and the estimation of the degradation states may be performed for each of the management groups.

In addition, the descriptions provided with reference to FIGS. 1 to 8, and FIG. 10 may be applied to the memory management method of FIG. 9.

Figure 10:
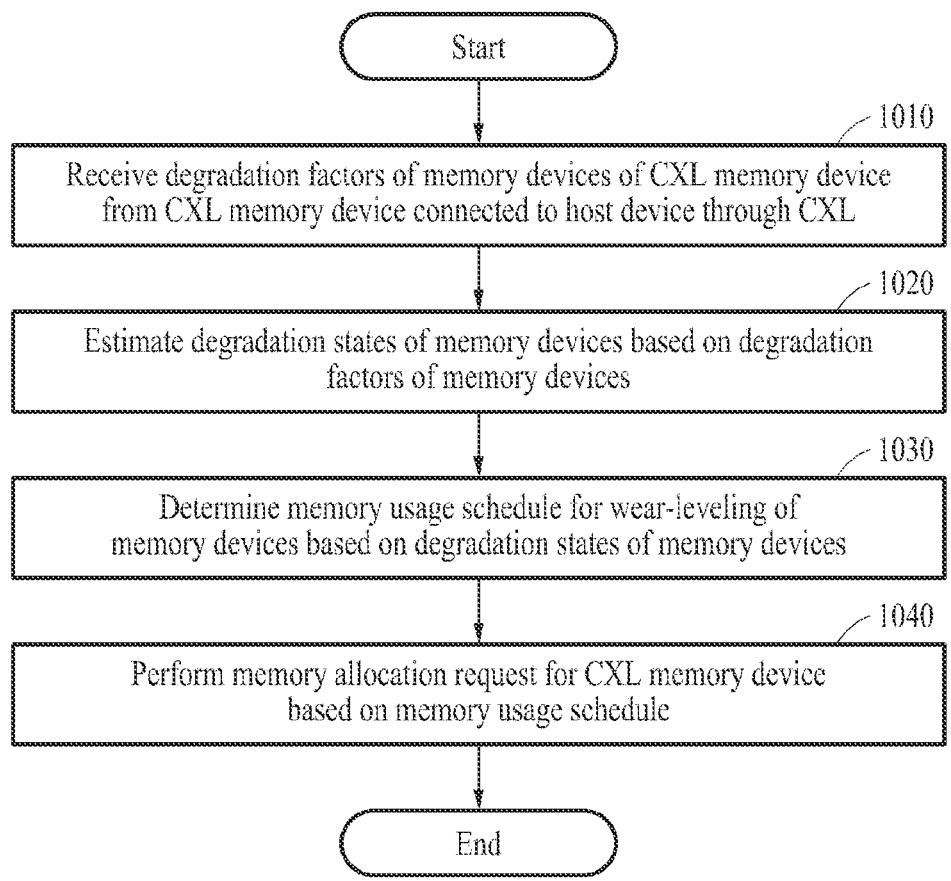
FIG. 10 illustrates an example of a memory management method based on a degradation factor by a host device.

FIG. 10 illustrates an example of a memory management method based on a degradation factor by a host device. Operations 1010 through 1040 of FIG. 9 may be performed in the shown order and manner. However, the order of one or more of the operations may change and/or one or more of the operations may be performed in parallel or simultaneously without departing from the spirit and scope of the shown examples.

Referring to FIG. 10, a host device may receive degradation factors of memory devices of a CXL memory device from the CXL memory device connected to the host device through CXL in operation 1010, estimate degradation states of the memory devices based on the degradation factors of the memory devices in operation 1020, determine a memory usage schedule for wear-leveling of the memory devices based on the degradation states of the memory devices in operation 1030, and perform a memory allocation request for the CXL memory device based on the memory usage schedule in operation 1040.

When the memory usage schedule is determined in operation 1030, the host device may determine the memory usage schedule such that the degradation parameter values representing the degradation states of the memory devices are distributed evenly.

The degradation parameter values may be determined based on at least one of BTI or HCI of the memory devices. The operation of the memory devices may include a static operation in a saturation status and a transition operation in a unsaturation status. When the memory devices are in the saturation status, the degradation parameter values may be determined using BTI, and when the memory devices are in the unsaturation status, the degradation parameter values may be determined using HCI.

In addition, the descriptions provided with reference to FIGS. 1 to 9 may be applied to the memory management method of FIG. 10.

The host devices, CXL memory devices, control components, memory components, sensors, CXL switches, memory cell groups, CXL memory boxes, first control components, second control components, CXL memory systems, processors, memory modules, management groups, host device 110, CXL memory device 120, control component 121, memory components 122, sensors 123, CXL switch 130, host device 510, CXL memory device 520, control component 521, memory cell group 522, sensors 523, CXL switch 530, CXL memory device 540, control component 541, memory cell groups 542, sensors 543, host device 610, CXL memory box 630, control component 631, CXL memory devices 632, sensors 633, CXL memory box 640, first control component 641, second control component 642, CXL memory devices 643, sensors 644, CXL memory box 650, first control component 651, CXL memory devices 652, sensors 653, CXL switch 660, CXL memory system 700, host device 710, control component 720, CXL memory boxes 730, host device 750, processor 751, CXL switch 760, CXL memory device 770, control component 771, memory components 772, sensors 773, host device 830, control component 820, memory modules 810, management groups 811, and other apparatuses, devices, units, modules, and components disclosed and described herein with respect to FIGS. 1-10 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RW, DVD-ROMs, DVD-Rs, DVD+ Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A Compute Express Link (CXL) memory device comprising:
   memory cell groups configured to store data;
   one or more sensors configured to measure degradation factors of the memory cell groups, wherein an operation of the memory cell groups comprises a static operation in a saturation status and a transition operation in an unsaturation status; and
   a control component configured to:
      receive a memory allocation request from a host device connected to the CXL memory device using CXL;
      estimate degradation states of the memory cell groups based on the degradation factors of the memory cell groups;
      determine degradation parameter values representing the degradation states of the memory cell groups based on whether the memory cell groups in the saturation status or in the unsaturation status;
      determine a memory usage schedule for wear-leveling of the memory cell groups based on the degradation states of the memory cell groups; and
      perform memory allocation of the memory cell groups for the host device based on the degradation states of the memory cell groups according to the memory usage schedule.

2. The CXL memory device of claim 1, wherein, for the determining of the memory usage schedule, the control component is configured to determine the memory usage schedule such that the degradation parameter values representing the degradation states of the memory cell groups are distributed evenly.

3. The CXL memory device of claim 1, wherein the control component is configured to determine the degradation parameter values based on either one or both of bias temperature instability (BTI) and hot carrier injection (HCI) of the memory cell groups.

4. The CXL memory device of claim 3,
   and
   wherein the control component is configured to:
      determine the degradation parameter values using bias temperature instability (BTI) of the memory cell groups in response to the memory cell groups in the saturation status; and
      determine the degradation parameter values using the hot carrier injection (HCI) of the memory cell groups in response to the memory cell groups in the unsaturation status.

5. The CXL memory device of claim 1, wherein, for the performing of the memory allocation, the control component is configured to:
   select a physical memory address from memory addresses of the memory cell groups based on the memory usage schedule; and
   map the physical memory address to a virtual memory address according to the memory allocation request of the host device to determine address translation information.

6. The CXL memory device of claim 1, wherein the control component is configured to migrate data stored in a memory space in high degradation states of the memory cell groups based on the memory usage schedule to a memory space in low degradation states of the memory cell groups.

7. The CXL memory device of claim 1, wherein the degradation factors comprise any one or any combination of any two or more of an operating voltage, an operation temperature, an operation time, and an operation count of the memory cell groups.

8. The CXL memory device of claim 1,
   wherein a first memory cell group of the memory cell groups has a different characteristic from a second memory cell group of the memory cell groups, and
   wherein the characteristic comprises either one or both of performance and life expectancy.

9. The CXL memory device of claim 1,
   wherein the memory cell groups are divided into management groups according to a degradation management unit of any one of a page unit, a bank unit, and a rank unit, and
   wherein the degradation factors are collected and the degradation states are estimated for each of the management groups.

10. A CXL memory system comprising the CXL memory device of claim 1 and the host device.

11. A host device comprising:
    one or more processors configured to:
       receive degradation factors of memory components of a Compute Express Link (CXL) memory device from the CXL memory device connected to the host device using CXL, wherein an operation of the memory components comprises a static operation in a saturation status and a transition operation in an unsaturation status;

estimate degradation states of the memory components based on the degradation factors of the memory components;

determine degradation parameter values representing the degradation states of the memory components based on whether the memory components is in the saturation status or in the unsaturation status;

determine a memory usage schedule for wear-leveling of the memory components based on the degradation states of the memory components; and perform a memory allocation request for the CXL memory device based on the memory usage schedule.

12. The host device of claim 11, wherein, for the determining of the memory usage schedule, the one or more processors are configured to determine the memory usage schedule such that the degradation parameter values representing the degradation states of the memory components are distributed evenly.

13. The host device of claim 12,
wherein the degradation parameter values are determined based on either one or both of bias temperature instability (BTI) and hot carrier injection (HCI) of the memory components,
wherein the one or more processors are configured to:
determine the degradation parameter values using the BTI in response to the memory components in the saturation status; and
determine the degradation parameter values using the HCI in response to the memory components in the unsaturation status.

14. A Compute Express Link (CXL) memory box comprising:
CXL memory devices each comprising memory cell groups configured to store data, and a sub-control component configured to control the memory cell groups;
one or more sensors configured to measure degradation factors of the CXL memory devices; and
a control component configured to:
receive a memory allocation request from a host device connected to the CXL memory box using CXL; and
perform memory allocation of the CXL memory devices for the host device based on degradation states of the CXL memory devices according to the degradation factors of the CXL memory devices, comprising:
select a physical memory address from memory addresses of the CXL memory devices based on the memory usage schedule; and
map the physical memory address to a virtual memory address according to the memory allocation request of the host device to determine address translation information.

15. The CXL memory box of claim 14, wherein, for the performing of the memory allocation, the control component is configured to:
estimate the degradation states of the CXL memory devices based on the degradation factors of the CXL memory devices; and
determine a memory usage schedule for wear-leveling of the CXL memory devices based on the degradation states of the CXL memory devices.

16. The CXL memory box of claim 15, wherein, for the determining of the memory usage schedule, the control component is configured to determine the memory usage schedule such that degradation parameter values representing the degradation states of the CXL memory devices are distributed evenly.

17. A CXL memory system comprising the CXL memory box of claim 14 and the host device.

18. A Compute Express Link (CXL) memory system comprising:
a host device configured to generate a memory allocation request;
CXL memory boxes each comprising CXL memory devices configured to store data, and a sub-control component configured to control the CXL memory devices; and
a control component configured to perform memory allocation of the CXL memory boxes for the host device based on degradation states of the CXL memory boxes according to degradation factors of the CXL memory boxes, comprising:
select a physical memory address from memory addresses of the CXL memory boxes based on the memory usage schedule; and
map the physical memory address to a virtual memory address according to the memory allocation request of the host device to determine address translation information.

19. The CXL memory system of claim 18, wherein the CXL memory devices each comprise memory cell groups configured to store data, and a sub-control component configured to control the memory cell groups.

20. The CXL memory system of claim 18, wherein, for the performing of the memory allocation, the control component is configured to:
estimate the degradation states of the CXL memory boxes based on the degradation factors of the CXL memory boxes; and
determine a memory usage schedule for wear-leveling of the CXL memory boxes based on the degradation states of the CXL memory boxes.

21. The CXL memory system of claim 20, wherein, for the determining of the memory usage schedule, the control component is configured to determine the memory usage schedule such that degradation parameter values representing the degradation states of the CXL memory boxes are distributed evenly.

22. A memory management method of a Compute Express Link (CXL) memory device, the memory management method comprising:
collecting degradation factors of memory components of the CXL memory device;
receiving a memory allocation request from a host device connected to the CXL memory device using CXL; and
performing memory allocation of the memory components for the host device,
wherein at least some parts of the memory allocation request and the memory allocation are performed based on degradation states of the memory components according to the degradation factors of the memory components, comprising:
selecting a physical memory address from memory addresses of the memory components based on the memory usage schedule; and
mapping the physical memory address to a virtual memory address according to the memory allocation request of the host device to determine address translation information.

23. The memory management method of claim 22, wherein the performing of the memory allocation comprises:

estimating the degradation states of the memory components based on the degradation factors of the memory components; and determining a memory usage schedule for wear-leveling of the memory components based on the degradation states of the memory components, wherein the memory allocation is performed based on the memory usage schedule.

24. The memory management method of claim 23, wherein the determining of the memory usage schedule comprises determining the memory usage schedule such that degradation parameter values representing the degradation states of the memory components are distributed evenly.

25. The CXL memory device of claim 1 is a CXL memory expansion device using a CXL interface.

26. The hose device of claim 11, wherein the CXL memory device is a CXL memory expansion device using a CXL interface.

27. The CXL memory box of claim 14, wherein the CXL memory devices are CXL memory expansion devices using a CXL interface.

28. The CXL memory system of claim 18, wherein the CXL memory devices are CXL memory expansion devices using a CXL interface.

29. The method of claim 22, wherein the CXL memory device is a CXL memory expansion device using a CXL interface.

* * * * *